US005553930A

United States Patent [19]
Rivard et al.

[11] Patent Number: 5,553,930
[45] Date of Patent: Sep. 10, 1996

[54] VARIABLE DUTY CYCLE ANTILOCK BRAKING SYSTEM WITH ACCELEROMETER AND FAIL-SAFE

[75] Inventors: Robert M. Rivard, West Bloomfield; Michael J. Schneider, Bloomfield Township, both of Mich.; Tamas I. Pattantyus, Elyria, Ohio; Kenneth S. Towers, Granger, Ind.; Jack R. Phipps, Bristol, Tenn.

[73] Assignee: AlliedSignal Inc., Morristown, N.J.

[21] Appl. No.: 524,271

[22] Filed: Sep. 6, 1995

Related U.S. Application Data

[62] Division of Ser. No. 353,861, Dec. 12, 1994, Pat. No. 5,487,598.
[51] Int. Cl.⁶ ...................................................... B60T 8/32
[52] U.S. Cl. ............................................ 303/174; 303/177
[58] Field of Search ........................... 303/113.1, 113.2, 303/113.3, 166, 119.1, 119.2, 116.1, 116.2, 115.1, 13–14, 18, 15, 122, 122.05, 122.09, 122.06, DIG. 3, DIG. 4, 174, 171, 177, 176, 156, 158, 155, 167; 364/426.01, 426.02, 426.03

[56] References Cited

U.S. PATENT DOCUMENTS

| | | | |
|---|---|---|---|
| 4,180,223 | 12/1979 | Amberg | 303/126 |
| 4,794,538 | 12/1988 | Cao et al. | 303/166 |
| 5,050,940 | 9/1991 | Bedford et al. | 188/181 C |
| 5,487,598 | 1/1996 | Rivard et al. | |

*Primary Examiner*—Douglas C. Butler
*Attorney, Agent, or Firm*—Leo H. McCormick, Jr.

[57] ABSTRACT

Improvements in vehicle antilock braking systems of the type having an operator controlled master cylinder (11) and a second source (55, 57) of pressurized hydraulic fluid for selectively supplying rebuild pressure after an antilock event are disclosed. The improved system is selectively operable in one of three braking modes, a normal braking mode (119) where braking force is proportional to an operator brake pedal pressure, an enhanced anti-skid braking mode (69) where braking force may be maintained at a maximum nonskid level, and a conventional anti-skid braking mode (71) where braking force follows a cyclic pattern of fluid pressure bleed and build. The system includes circuitry (17, 19, 35, 37, 93, 95) for determining the speed of each wheel and an arrangement (59) operable independently of any vehicle wheels for determining vehicle deceleration. This comparison normally invokes the enhanced anti-skid braking mode. In the enhanced mode, the system is continually searching for an optimum wheel speed reference (39) by determining (119) on which side of the peak of a mu-slip curve the vehicle is operating, for example, by calculating the sign of the slope of the mu-slip curve at the current vehicle operating point, and then incrementing (88) a prior wheel speed reference by a value (79) which changes the wheel speed reference toward the peak (75) of the mu-slip curve thereby calculating an updated wheel speed reference to control appropriately the braking system. The accuracy of the determined vehicle deceleration, and in particular, of the accelerometer is confirmed by comparison (63) to an expected deceleration based on operator brake pressure, and the conventional anti-skid braking mode is substituted for the enhanced anti-skid braking mode in the event the determined vehicle deceleration is determined to be inaccurate. The enhanced anti-skid mode utilizes a pulse width modulated solenoid actuated two position valve (41, 43) operable in one position to provide a fluid flow path from the braking device, and in the other position to provide a fluid flow path from a second source to the braking device.

3 Claims, 4 Drawing Sheets

VARIABLE DUTY CYCLE ANTILOCK BRAKING SYSTEM WITH ACCELEROMETER AND FAIL-SAFE

This application is a division of application Ser. No. 08/353,861 filed Dec. 12, 1994, now U.S. Pat. No. 5,487,598.

BACKGROUND OF THE INVENTION

The present invention relates generally to vehicular braking systems and more particularly to vehicle braking systems having anti-skid or antilock features.

Many known anti-skid devices simulate a driver induced anti-skid technique by cyclically increasing and decreasing the braking force exerted on the wheels so that a slipping wheel having a tendency to lock is permitted to re-accelerate back to a speed corresponding to the speed of the vehicle. This is typically achieved by control valves alternately allowing fluid to flow out of and then into the brake cylinder, causing a lowering and raising the pressure of the fluid supplied to operate the brake cylinder associated with the wheels of a vehicle. In such a conventional antilock braking system, the controlled wheel occasionally begins slipping too much and operates for short times with a comparatively large amount of slip, this means a level of slip high enough to effect or reduce lateral forces available for steering and vehicle stability. In addition, excessive slip is frequently associated with reduced braking effectiveness, increased tire wear and shock loading on suspension components, difficulty in steering control, and is generally disturbing to the vehicle occupants.

While such cycling causes momentary reduction in braking effectiveness as well as reduced stability and steerability, and other undesirable effects, it is useful in allowing re-setting of the calculated vehicle velocity. Many antilock braking systems are invoked when a calculated wheel speed differs sufficiently from a sensed wheel speed. In the typical system, wheel speeds are used to determine slip by comparison to a computed vehicle velocity either directly or indirectly. Without a constant re-checking of the computed vehicle velocity, errors will accumulate and cause serious degradation leading to substantially reduced braking and/or reduced lateral force.

It is desirable to provide a system that is immune to the problem of accumulated errors and which acts as a continuous process with the corrective action taken being proportional to the deviation from a desired performance. Such a process is relatively easy to control using conventional feedback methods such as Proportional-Integral-Differential (PID) controllers. With such a system, a differential correction is readily included allowing the system to anticipate future conditions by reacting to the rate of change of the error condition. Also, an integral term can reduce the steady state error.

Some antilock braking systems also operate on a so-called pump-back principle where the same hydraulic fluid is returned to the brake pad actuators subsequent to an antiskid event while others operate on a replenish principle where the reapply or build fluid comes from a separate source, frequently a hydraulic accumulator. The latter requires only a moderate sized pump while the pump-back type systems require a more expensive pump capable of supplying the maximum instantaneous flow rate.

It is desirable to provide a simple, quiet replenish type system utilizing a low cost accelerometer which system maintains maximum braking force near the peak of the mu-slip curve at all times.

SUMMARY OF THE INVENTION

In general, the present invention discloses a method of calculating wheel speed reference for the control of a vehicle antilock braking system includes measuring the current vehicle deceleration. A vehicle wheel speed reference is repeatedly computed by comparing the sign of the most recent change in computed force to the most recent change in computed vehicle wheel speed reference, and updating the previously computed wheel speed reference by incrementing that previous value. A comparison of the most recent change in vehicle acceleration to the most recent change in wheel slip may also be employed to determine the appropriate incrementation. The vehicle braking system is then appropriately controlled by repeatedly measuring each wheel speed, repeatedly comparing the calculated wheel speed reference to the measured wheel speed, and controlling the antilock (anti-skid) braking mode operation accordingly. An operator commanded vehicle deceleration is determined and the braking system is converted from an existing braking mode to an anti-skid braking mode in the event the measured vehicle deceleration differs from the operator commanded vehicle deceleration by more than a specified amount.

Also in general and in one form of the invention, an improved vehicle antilock braking system has a control arrangement for identifying a wheel skid condition and a first flow control valve which changes position in response to an identified wheel skid condition. While the skid condition prevails, the second flow control device is duty cycle modulated between the two positions with a duty factor selected to maintain the fluid pressure to the braking device at a maximum nonskid level. The control means for identifying the wheel skid condition includes one arrangement for measuring the speed of the wheel and another arrangement for measuring the vehicle deceleration rate independent of wheel speed. The measured deceleration rate is utilized to compute a wheel speed reference. The wheel speed reference and the measured speed of the wheel are then used in a feedback loop for braking control.

BRIEF DESCRIPTION OF THE DRAWING

Corresponding reference characters indicate corresponding parts throughout the several views of the drawing.

DESCRIPTION OF THE PREFERRED EMBODIMENT

Figure 1:
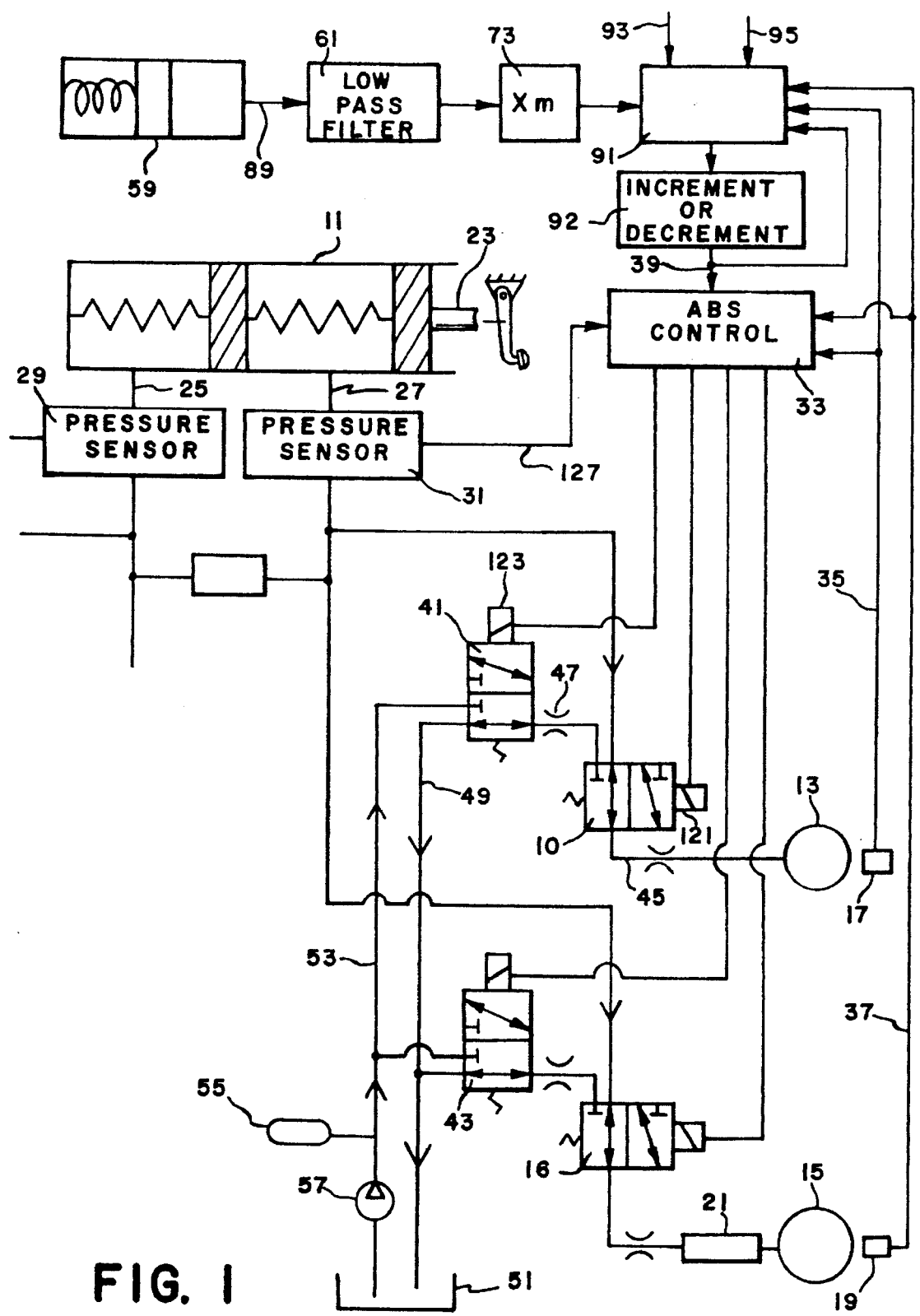
FIG. 1 is a schematic representation of an overall brake and anti-skid system illustrating the present invention in one form.

A portion of an antilock braking system for a passenger car or similar vehicle is shown schematically in FIG. 1. The system has solenoid actuated anti-skid or isolation valves 10 and 16 between an operator-controlled pressure source or master cylinder 11 and corresponding front wheel 13 and rear wheel 15 hydraulic brake actuators. Typically, the pressure source 11 is a conventional master cylinder having two separate circuits, one for the left front vehicle wheel brake 13 and the right rear vehicle wheel brake 15, and the other, which is substantially identical and not shown for the right front/left rear vehicle wheel brakes. There are conventional proportioning valves such as 21 which are present to reduce the likelihood of a rear wheel skid by applying a only a portion of the line pressure to the rear wheel brake cylinders when the hydraulic pressure is above some predetermined threshold. The vehicle wheels also have rotational speed sensors such as 17 and 19 for providing control unit 33 with electrical indications of the angular velocities of individual wheels.

When the driver wishes to slow the vehicle, the linkage 23 from pedal 23 supplies pistons in master cylinder 11 with an input force to pressurize fluid therein which communicated from the master cylinder 11 by way of conduits (brake lines) 25 and 27 to a pair of pressure sensors 29 and 31, and thence to the respective pairs of brake actuators (wheel cylinders) by way of four individual solenoid actuated valves such as 10 and 16. The individual wheel isolation valves such as 10 and 16 are normally in the position shown and transmit the fluid pressure directly to the wheel cylinders to brake the vehicle. In the event, the electrical indications from the speed sensors (17, 19,) supplied to the electronic control unit 33 detects a sufficient difference between wheel deceleration and measured vehicle deceleration to indicate a skid, an actuating signal is sent to the appropriate ones of four solenoid actuated anti-skid valves such as 10 and 16 to shut off the hydraulic fluid path from the master cylinder 11 to the wheel cylinder, and to establish instead a bleed path from the wheel cylinder by way of conduits such as 45, 47 and 49 to a common low pressure reservoir such as the sump 51 thereby relieving the brake actuator pressure allowing the slipping wheel to accelerate. At a time when wheel speed gets sufficiently close to the vehicle speed and remains there for a predetermined time, the solenoid is de-energized and anti-skid valve 10 or 16 resumes its normal braking condition where the conduit 45, for example, is reconnected to master cylinder 11 through conduit 27. Periodically, during the time fluid is being bled from the brake actuator, a valve such as 41 or 43 is actuated to connect conduits 47 and 53 so that rebuild pressure is supplied from accumulator 55 through the series connected valves 41 and 10 or 43 and 16 to the individual wheel cylinders. The pressure in accumulator 55 is maintained by pump 57 and its associated driving motor.

The solenoids such as 123,123' of valves 41 and 43 are periodically energized and deenergized until controller circuit 33 indicates the slip has been adequately reduced. So long as the corresponding isolation valve 10 or 16 is enabled as by current flow in an illustrative control solenoid 121, the solenoid valve 41 or 43 is operated at a constant frequency and the relative on-time is changed so that the average pressure at the brake port varies in concert with the duty factor or percentage of on-time. The selection of an appropriate duty factor to retain maximum braking force is determined by control unit 33 in a manner to be described subsequently. The maximum amplitude of pressure oscillations is determined by the frequency of valve operation and the orifices used in the valve. If the frequency is sufficiently high, brake compliance is adequate to attenuate the oscillations so there is little or no variation in braking due to the oscillations.

An accelerometer 59 measures vehicle acceleration and that measure is passed through the low-pass filter 61 to filter out effects of engine vibrations, rough roads and other extraneous effects. Similar filters (not shown) may be used on the several wheel speed sensors such as 17 and 19. Thereafter, the filtered acceleration signal is first multiplied by the mass of the vehicle at 73 to compute the decelerating force on the vehicle, and that current force value is utilized to provide the current wheel speed reference on line 39 by the recursive relationship:

$$V_r(k) = V_r(k-1) + \Delta V * sign(\Delta F / \Delta V_r) \tag{1}$$

where:

$V_r(k-1)$ is the currently computed wheel speed reference;

$V_r(k-1)$ is the wheel speed reference computed during the immediately previous iteration;

$\Delta V_r$ is the change in wheel speed reference computed from the difference between $V_r(k-1)$; and $V_r(k-2)$, and $\Delta F$ is the change in decelerating force computed from the difference between $F(k)$ and $F(k-1)$.

The force $F(k)$ is the force calculated from the vehicle acceleration measurement at time k, the current time. The force $F(k-1)$ would be the result of the acceleration computed at time k–1 (one sample period earlier) and used until time k. Thus, the values used for the wheel speed reference are those determined a sample period prior to the corresponding stopping force values. $\Delta V$ is an incremental value which is added to or subtracted from the previously computed wheel speed reference accordingly as the sign of the force/velocity gradient is positive or negative to provide a new wheel speed reference value. While division to obtain the force/velocity gradient is indicated at 87, only the signs of the changes need be considered. If both are the same, the sign of the quotient is positive and it is negative if they differ. The specific value of $\Delta V$ may vary or may be fixed. The circuitry for implementing equation (1) is shown generally at 91 and 92.

Figures 2, 3, 5, 7:
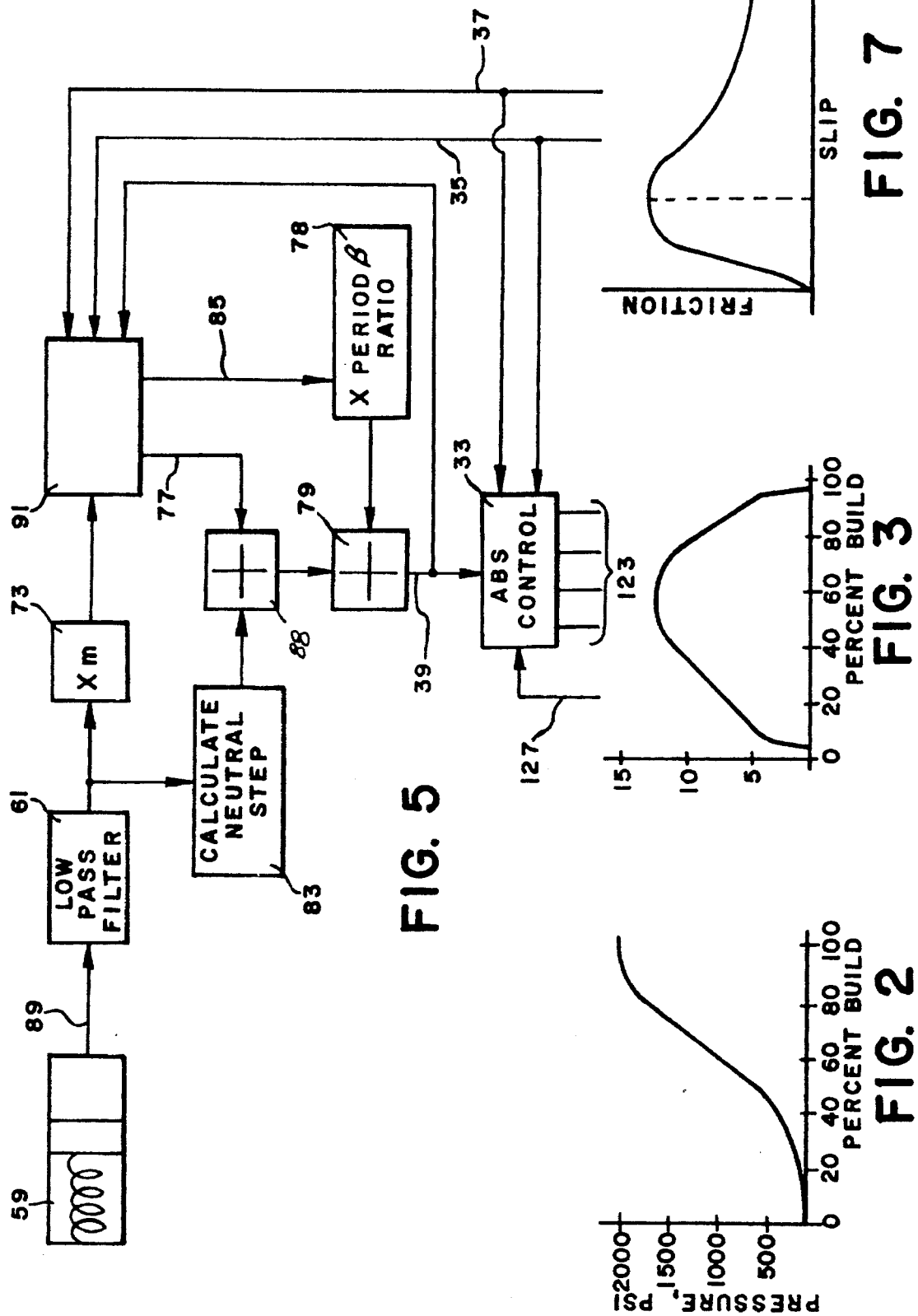
FIG. 2 is a graph of brake actuator pressure as a function of the solenoid enabling duty cycle.
FIG. 3 is a graph of control valve rebuild fluid flow rate as a function of the solenoid enabling duty cycle.
FIG. 5 is a schematic representation of a control portion of a brake and anti-skid control system illustrating a modification of the system of FIG. 1.
FIG. 7 is a mu-slip curve depicting tire friction as a function of tire slip.

To better understand the reason for selecting the force/velocity gradient to indicate the direction of incrementation, consider FIG. 7. An increase in wheel speed corresponds to an decrease in the slip. Thus, if the force/velocity gradient is positive, the force/slip gradient is negative and the vehicle is operating on the right side of the maximum braking friction line 75. The computed wheel speed reference would be incremented, reducing the slip and moving the point of operation closer to the maximum friction line 75. To the left of this line, the force/slip gradient (slope of the mu-slip curve) is positive. On this side, a negative force/velocity gradient causes decrementation of the wheel speed reference (corresponding to an increase in slip) again moving the operating point closer to the peak friction line.

As will be discussed in greater detail in conjunction with FIGS. 5 and 6, the sign of the quotient of vehicle acceleration divided by wheel slip provides an alternative to the force/velocity gradient. When operation is in the undesirable region to the right of the maximum braking friction line 75, an increase in slip corresponds to a decrease in braking friction, a decrease in deceleration, and therefore, an increase in acceleration. Under these conditions, the wheel speed reference will be appropriately incremented to reduce the slip. Similarly, operation to the left of line 75 will call for an increase in slip which is equivalent to a reduction in the wheel speed reference.

The step size or incremental value $\Delta V$ is typically different for differing signs of the force/velocity gradient. One effective way to calculate step size is to make the maximum deceleration rate of the wheel speed reference proportional to the deceleration rate of the vehicle. If the deceleration rate of the wheel speed reference is twice that of the vehicle, for example, then the reference will change in the downward direction relative to the vehicle speed at a rate equal to that of the vehicle. The same step size in the upward direction, however, would allow the reference to increase relative to vehicle speed at a rate three times the deceleration rate of the vehicle. Such an upward step which is equal to the downward step is unnecessarily large and will contribute to higher control errors. Preferably, the rate at which the reference can move relative to the vehicle velocity should be roughly balanced in the up and down directions. Such a balance will tend to cancel errors caused by the wheel speed reference occasionally changing in the wrong direction. An upward step of about 10% of the downward step will provide an upward rate of 1.2 times the vehicle deceleration and a downward rate equal to vehicle deceleration.

The period for incrementing the wheel speed reference, if too large, will not allow the vehicle wheel speed reference to keep up with the actual vehicle speed resulting in reduced braking efficiency while a smaller period leads to more frequent and smaller amplitude oscillations in the wheel speed and, as a result, higher braking efficiency. If the increment period is too small, particularly in relation to the time lag of the wheel speed control loop, loss of control may result. The minimum period is also limited by the time required for the filter 61 to modify or filter the output signal from accelerometer 59. With a wheel speed control increment period of 0.010 seconds, wheel speed reference increment periods of about 0.100 seconds are preferred.

Of course, the recursive relationship assumes initialization; that is, some reference velocity and change in reference velocity must be determined independently of the relationship, or initial values assumed and the relationship allowed to settle into a steady state condition. For example, it is possible to establish vehicle velocity by measuring vehicle wheel speed, and then to utilize that established vehicle velocity as the initial previously computed wheel speed reference in the updating step.

The recursive relationship provides stepped wheel speed reference estimates. The preferred step size is directly proportional to the increment period. Any abrupt changes may be smoothed somewhat by an increased iteration rate of the recursion relationship. The wheel speed reference estimates may also be smoothed between endpoints of the sample period by replacing the step with a ramp which gradually increases or decreases over the sample period. Thus, updating is performed gradually by increasing the previous reference at a rate equal to the increment divided by the time between two consecutive computations of vehicle wheel speed reference in the event the sign of the gradient is positive, and by gradually decreasing that previous reference value at a rate equal to the decrement divided by the time between two consecutive computations of wheel speed reference in the event the sign of the gradient is negative.

Figure 8:
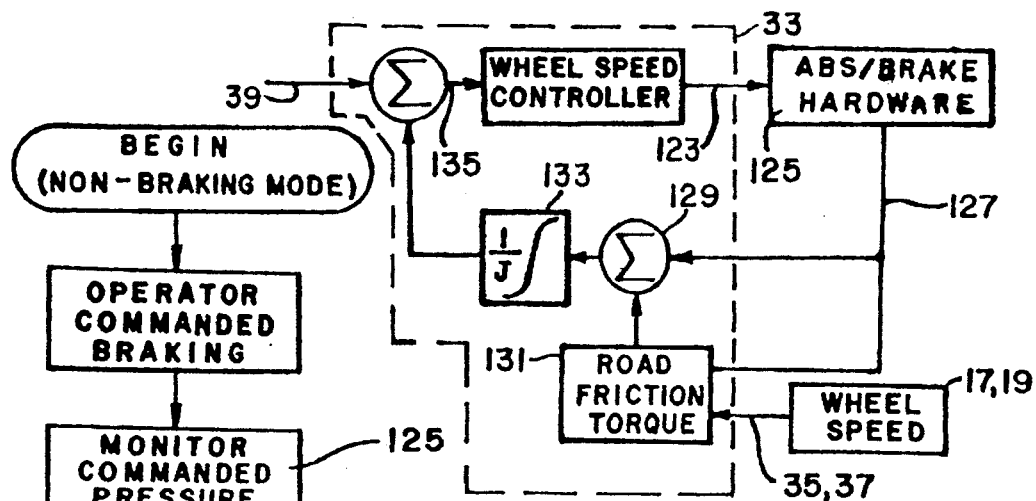
FIG. 8 is a schematic illustration of a control loop for one wheel.

FIG. 5 illustrates the modifications to FIG. 1 to accomplish the ramp rather than step increment. The increment or decrement is integrated at 77 over the sample period and that value is added to the previous estimate of the wheel speed reference at 79. FIG. 5 illustrates another modification to the system of FIG. 1. A so-called neutral step ($V_n$) may be computed at 83 by the equation:

$$V_n = A * T * (0.85) \qquad (2)$$

where: A is the vehicle acceleration;

T is the sample period of the closed loop wheel speed controller of FIG. 8 (typically about 0.010 seconds); and a correction factor of 0.85 (although other factors may be more appropriate for other situations) is an estimate of the fraction of vehicle speed corresponding to the peaks of the mu-slip curve.

Figure 6:
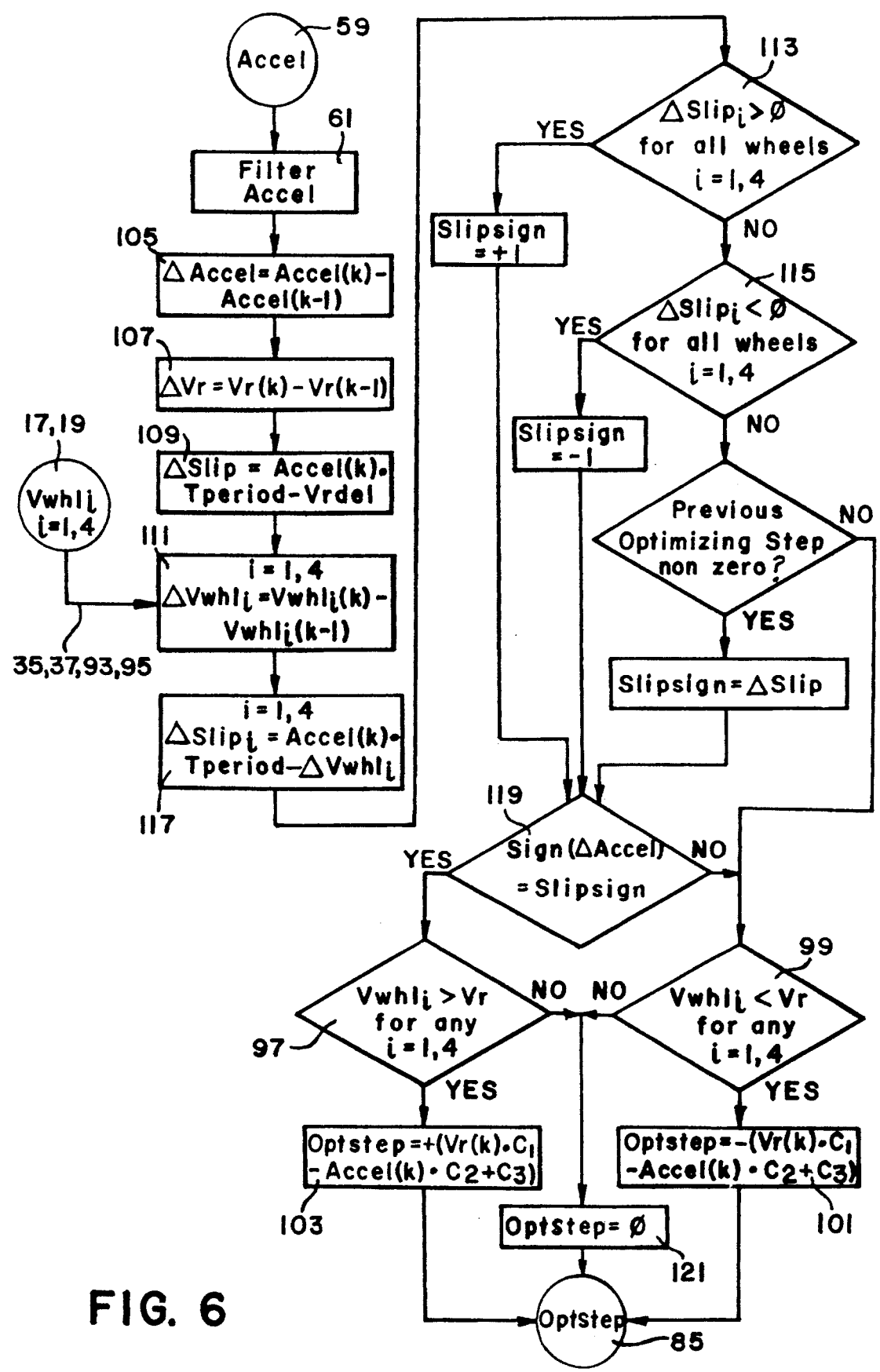
FIG. 6 is a flow chart illustrating a wheel speed reference optimizing algorithm for the system of FIG. 5.

The magnitude of this neutral step is selected so as to just keep pace with the current vehicle deceleration. In the embodiment of FIG. 5, the wheel speed reference is determined by the following relationship:

$$V_r(k) = V_r(k-1) + V_n + \beta \text{optstep} \qquad (3)$$

where: optstep may be zero, an increment added to the neutral step if the acceleration/slip gradient is positive, or an increment subtracted from the (negative) neutral step if the acceleration/slip gradient is negative and is computed as in FIG. 6. $\beta$ is the ratio of the period of the wheel speed controller and the optimizing period. The optimizing step is typically calculated about every 0.1 seconds, far less frequently than the neutral step. In FIG. 5, a fraction $\beta$ of optstep is added at 79 to the neutral step and used to increment the wheel speed reference at 88. Thus, when optstep =0, only the neutral step is selected, and is subtracted from the previous value of the wheel speed reference at 88, the new wheel speed reference is based on the current vehicle deceleration. The algorithm is not "hunting" rather, it is just keeping up with deceleration by decrementing the previously computed wheel speed reference.

There are three different names for the increment used: $\Delta V$, neutral step and optstep. The concept of Equation (1) uses $\Delta V$ to move the wheel speed reference in the direction to achieve optimal ABS performance and uses much smaller steps when raising the reference that when lowering it to compensate for vehicle deceleration. The concept of Equation (3) uses a neutral step to compensate for vehicle deceleration and optimizing step to move the reference in the optimizing direction allowing the optimizing step upward and downward to be of equal size.

The wheel speed reference on line 39 provides the input to a closed loop wheel speed controller 33, the basic feedback arrangement of which is shown in FIG. 8. This closed loop wheel speed control applies to the embodiment of either FIG. 1 or FIG. 5. Of course, many of the features of either embodiment may be readily incorporated into the other embodiment. The ABS valve signals on lines 123 are applied to the braking hardware 125. Hydraulic line pressure is returned on line 127 and applied to the adder 129 as a measure of brake torque. A measure of vehicle acceleration is integrated at 133 to determine vehicle wheel speed. For example, the sum of the road friction torque 131 and brake torque may be integrated at 133 and divided by the wheel inertia J to provide a wheel speed indication. The difference between the wheel speed and wheel speed reference is determined at 139 to provide the error signal on line 135. One technique for determining road friction force 131 is to repeatedly measure the hydraulic pressure being applied to a wheel cylinder. The wheel velocity is similarly repeatedly measured. From the velocity measurements, wheel acceleration is determined and successive values of acceleration are compared. Times at which the acceleration is zero are determined. For example, when the sign of the acceleration changes, there was a time between the two successive measurements at which it was zero. At that time, wheel cylinder is directly proportional to road friction.

FIG. 2 shows a graph of brake actuator pressure as a function of the solenoid enabling duty cycle (percentage of each cycle during which the solenoid of valve 41 or 43 is energized) under steady state conditions while FIG. 3 illustrates the relationship between the duty cycle and the rate of hydraulic fluid flow in line 53. Control valves such as 41 and 43 have a pair of flow restricting orifices, one controlling the rate of decay flow in line 49, and the other controlling the build rate through line 53. These two graphs are for a valve having about equal size flow restricting orifices and show that for such equal restrictions, the maximum flow rate occurs at about 50% duty cycle and for about 50% apply pressure. With an orifice size selected to provide adequate response with moderate flow rates, it appears that the flow requirements are somewhat high for pump-back systems, however, the flow requirements are aptly suited to a moderately sized pump 57 in conjunction with an accumulator 55 to store pressurized fluid for momentary peaks in flow.

For many applications it is desirable to obtain better resolution at lower pressures, since delicate control is needed here to optimize stopping distance while maintaining controllability. Such better resolution at lower pressures may be obtained by using a relatively smaller restriction in the apply line 53 than in the decay line 49. This reduces maximum flow and shifts the maximum flow of FIG. 3 in the direction of higher apply pressure, and can reduce the accumulator 55 and pump 57 capacity requirements.

Figure 4:
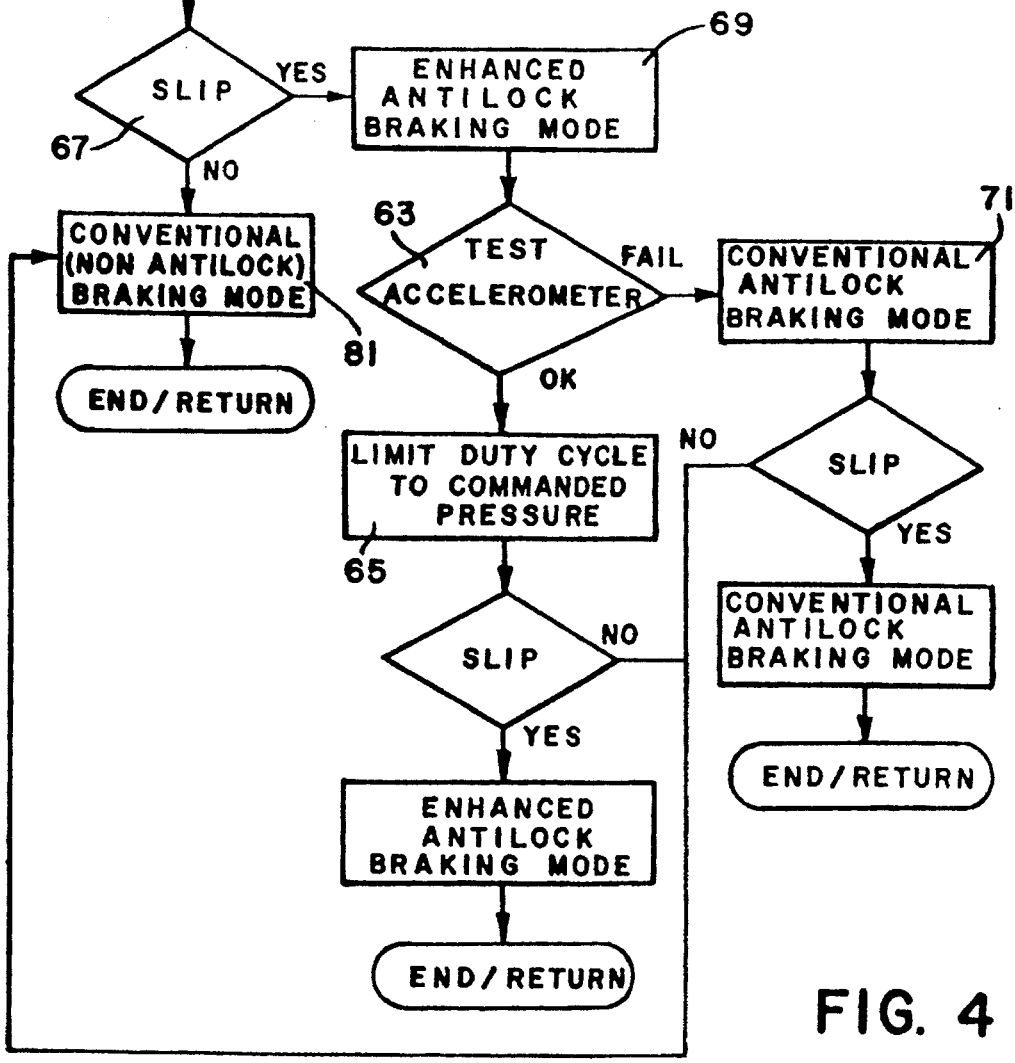
FIG. 4 is a flow chart illustrating the alternative modes of operation of the system of FIG. 1.

The several modes of operation of the braking system are illustrated in FIG. 4. From a non-braking condition, an operator depresses the brake pedal and rod 23 actuates the master cylinder 11 to supply braking pressure on lines 25 and 27. Pressure sensors 29 and 31 supply pressure information to control 33 which is utilized in the accelerometer test 63 and for duty factor limiting purposes at 65. Conventional braking 119 continues as long as it is commanded unless a slip is detected at 67. Initial slip detection causes the system to enter the enhanced anti-skid braking mode at 69. Since acceleration data is important for this mode of operation, accelerometer behavior is monitored at 63. The normal relationship between acceleration and master cylinder pressure during a non-ABS situation is used to detect failure of accelerometer 59. The indicated deceleration is compared to the sum of the deceleration contributions of each wheel as calculated from the measured pressures from sensors 29 and 31 by control unit 33. Should there be more than a prescribed difference between these values, the accelerometer fails test 63. Upon detection of a failure of the accelerometer, the system converts to a conventional antilock braking mode of alternate build and decay at 71. A viable, but less desirable option upon accelerometer failure is to lock out all anti-skid braking and return to a conventional braking mode.

As noted earlier, in this enhanced mode, the valves such as 41 and 43 are duty factor modulated to maintain braking pressure near the peak of the mu-slip curve. Of course, the reapply pressure should not exceed the operator commanded pressure. Thus, controller 33 places an upper bound or limit on the duty cycle at 65 based on the commanded pressure 125 as indicated by pressure sensors such as 29 and 31. In either anti-skid mode 69 or 71, should a skid no longer be indicated or braking no longer called for, the system returns to normal operator commanded braking at 81.

The braking systems of FIGS. 1 or 5 require some additional logic illustrated generally by block 91 to keep the system under control. Comparing FIGS. 5 and 6, the wheel speed reference on line 39 should not be allowed to lead all four wheel speeds in either direction. The reference is tested against all four wheel speeds at 99 and the negative optstep is selected at 101 only if at least one new wheel speed is less than the reference. Similarly, the wheel speed reference is tested against all four wheel speeds at 97 and the positive optstep is selected at 103 only if at least one wheel speed exceeds the reference. Block 105 indicates the updating of both the acceleration and the change in that acceleration. Similarly, block 107 indicates the updating of both the wheel speed reference and the change in that wheel speed reference. The change in slip velocity is determined at block 109 which corresponds to a change in the wheel speed reference. Block 111 indicates the updating of both the individual measured wheel velocities and the changes in those wheel velocities for each of four wheels. Actual individual wheel slip values are then computed at 117. If all four wheel slips are increasing as indicated by a yes at 113, the slip sign is taken as positive. Similarly, if all change in actual wheel speed slips are decreasing as indicated by a yes at 115, the slip sign is taken as negative. In equation (3) an optstep increment is added to increase the wheel speed reference when operation is in the undesirable region to the right of the maximum braking friction line 75, that is, when the acceleration/slip gradient is positive. Since only the signs of the acceleration and slip changes effect the sign of the quotient, actual division to obtain the gradient is unnecessary. Only the signs of the changes need be considered. If both are the same as indicated by a yes at block 119 the sign of the quotient is positive and the wheel speed reference is incremented. If they differ, it is negative and decrementation as indicated at 101 is called for. No optstep (incrementation by only the neutral step in Equation 3) is indicated at 121 if no wheel speed has changed significantly from the wheel speed reference.

While a two-channel system has been described. The system can be implemented in two, three or four-channel versions. A three-channel system seems best suited to front-wheel drive vehicles. Those skilled in the art will devise many other adaptations, modifications and uses for the present invention beyond those herein disclosed yet within the scope of the present invention as set forth in the claims which follow.

What is claimed is:

1. In the control of a vehicle anti-lock braking system, the method of searching for an optimum wheel speed reference (39) comprising the steps of:

determining (119) on which side of the peak of a mu-slip curve the vehicle is operating by repeatedly computing a wheel speed reference to determining the sign of the ratio of the most recent change in measured acceleration to the most recent change in computed wheel slip, and updating a previously computed wheel speed reference by incrementing (103) that previous reference by the sum of a first amount and a second amount in the event the sign of the determined ratio is positive;

incrementing (101) said previously computed wheel speed reference by the difference between the first amount and the second amount in the event the sign of the determined ratio is negative;

incrementing (88) said wheel speed reference by a value (79) which changes said wheel speed reference toward a peak (75) of the m-slip curve thereby calculating an updated wheel speed reference, and utilizing (33) said updated wheel speed reference to control appropriately the braking system.

2. The method of claim 1 wherein the step of determining comprises calculating the sign of the slope of the mu-slip curve at the current vehicle operating point.

3. The method of claim 2 wherein the value by which the wheel speed reference is incremented is the sum of a predetermined value (83) and positive optimizing value (85) when the slope is negative and is the difference between the predetermined value (83) and the positive optimizing value (85) when the slope is positive.

* * * * *